(12) United States Patent
Yamada et al.

(10) Patent No.: US 7,932,307 B2
(45) Date of Patent: Apr. 26, 2011

(54) RUBBER COMPOSITION

(75) Inventors: Hiroshi Yamada, Tokyo (JP); Kazuhiro Yanagisawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 882 days.

(21) Appl. No.: 11/815,321

(22) PCT Filed: Feb. 1, 2006

(86) PCT No.: PCT/JP2006/301672
§ 371 (c)(1),
(2), (4) Date: Aug. 2, 2007

(87) PCT Pub. No.: WO2006/082852
PCT Pub. Date: Aug. 10, 2006

(65) Prior Publication Data
US 2010/0144951 A1 Jun. 10, 2010

(30) Foreign Application Priority Data

Feb. 3, 2005 (JP) .................................. 2005-027198

(51) Int. Cl.
*C08J 3/20* (2006.01)
*C08K 3/04* (2006.01)

(52) U.S. Cl. ..................... 523/351; 524/495; 524/496

(58) Field of Classification Search .................. 524/495, 524/496; 523/351
See application file for complete search history.

(56) References Cited

U.S. PATENT DOCUMENTS

| | | | | | |
|---|---|---|---|---|---|
| 4,548,980 | A | * | 10/1985 | Nagata et al. ................. | 524/495 |
| 5,321,072 | A | * | 6/1994 | Misono ......................... | 524/496 |
| 2003/0088006 | A1 | * | 5/2003 | Yanagisawa et al. ......... | 524/425 |

FOREIGN PATENT DOCUMENTS

| | | |
|---|---|---|
| JP | 5-222246 A | 8/1993 |
| JP | 5-230290 A | 9/1993 |

* cited by examiner

*Primary Examiner* — Peter D Mulcahy
(74) *Attorney, Agent, or Firm* — Sughrue Mion, PLLC

(57) ABSTRACT

A natural rubber wet masterbatch rubber composition comprising a mixture of a natural rubber latex with a slurry solution containing a carbon black dispersed therein, which satisfies the followings: (1) a CATB specific surface area ($m^2/g$) in the range of $60 < CTAB < 110$, (2) a 24M4DBP ($m^3/100\,g$) in the range of $55 < 24M4DBP < 75$, (3) a CATB specific surface area and a tint strength (TINT) having the relationship of $TINT > 0.41 \times CTAB + 81$, and (4) a compounding amount of 10 to 100 parts by mass relative to 100 parts by mass of natural rubber. The natural rubber wet masterbatch rubber composition can be suitably used for improving the resistance to fracture and to crack propagation of a tire, a steel coating rubber for a rubber product for industrial use, and the like.

9 Claims, No Drawings

RUBBER COMPOSITION

TECHNICAL FIELD

The present invention relates to a rubber composition comprising a natural rubber wet master batch. More preferably, the present invention relates to a rubber composition comprising a natural rubber wet master batch exhibiting excellent resistance to fracture and resistance to cut growth without adversely affecting the low heat buildup property and advantageously used for the steel coating rubber for tires.

BACKGROUND ART

Heretofore, carbon black having a low structure has been widely used in the steel coating rubber for tires and industrial rubber products for improving the resistance to fracture and used in a great amount to prevent easy deformation due to excessive softness in many cases. This always causes poor dispersion of carbon black in the rubber, and drawbacks arise in that sufficient resistance to cut growth is not obtained, the effect of improving the resistance to fracture is not obtained to the expected degree, and the heat buildup is increased.

A process for producing a natural rubber master batch for improving the workability, the reinforcing property and the abrasion resistance, which comprises a step of decomposing the amide bond in which the amide bond in natural rubber is decomposed and a step of mixing in which the latex obtained after the step of decomposing the amide bond is mixed with a slurry containing an inorganic filler such as carbon black, silica, alumina and calcium carbonate dispersed in water, is known (Patent Reference 1).

However, the process for producing a natural rubber master batch described above is conducted when the inorganic filler is mixed into natural rubber to improve the abrasion resistance of tread rubber of tires and rubber at the surface layer of conveyor belts but not to improve the resistance to fracture and resistance to cut growth of steel coating rubber.

Under the above circumstances, a rubber composition comprising a natural rubber wet master batch which can control the size distribution of carbon black within a prescribed range with stability, provides excellent dispersion of carbon black and can achieve the improvement in the resistance to fracture and the resistance to cut growth in steel coating rubber in the step of mixing a natural rubber latex with a slurry containing carbon black dispersed in water by improving the properties of carbon black used in the production of a natural rubber wet master batch, has been desired.

[Patent Reference 1] Japanese Patent Application Laid-Open No. 204-99625

DISCLOSURE OF THE INVENTION

The present invention has an object of providing a rubber composition comprising a natural rubber wet master batch which provides improved resistance to fracture and resistance to cut growth of steel coating rubber in tires and industrial rubber products.

As the result of intensive studies by the present inventors to achieve the above object, it was found that the above problems could be solved by improving the properties of carbon black used in the slurry containing carbon black dispersed in water in the production of the natural rubber wet master batch. The present invention has been completed based on the knowledge.

The present invention provides a rubber composition comprising a natural rubber wet master batch, which is obtained by mixing a natural rubber latex with a slurry obtained by dispersing carbon black in water in advance, wherein carbon black having:

(1) a CTAB specific surface area ($m^2/g$) in a range of 60<CTAB<110, (2) a 24M4 DBP ($cm^3/100$ g) in a range of 55<24M4 DBP<75 and (3) the CTAB specific surface area and a specific tinting strength (TINT) satisfying a relation of TINT>0.41×CTAB+81, is used in an amount of:

(4) 10 to 100 parts by mass per 100 parts by mass of a natural rubber component.

THE MOST PREFERRED EMBODIMENT TO CARRY OUT THE INVENTION

In the present invention, it is important that the CTAB specific surface area ($m^2/g$) is in the range of 60<CTAB<110. When the CTAB specific surface area is 60 or smaller, the sufficient resistance to cut growth cannot be surely obtained. When the CTAB specific surface area is 110 or greater, the heat buildup property markedly deteriorates. It is necessary that 24M4 DBP ($cm^3/100$ g) is in the range of 55<24M4 DBP<75 since the effect of improving the resistance to cut growth is not obtained when 24M4 DBP is 55 or smaller, and the resistance to fracture decreases when 24M4 DBP is 75 or greater. It is necessary that the CTAB specific surface area and the specific tinting strength (TINT) satisfy the relation of TINT>0.41×CTAB+81. When the specific tinting strength is 0.41×CTAB+81 or smaller, the size distribution of carbon black becomes wide, and the resistance to fracture and the resistance to cut growth decrease.

To produce carbon black used in the present invention described above, for example, in the apparatus for producing carbon black disclosed in Japanese Patent Application Laid-Open No. 2004-269788, a material oil is brought into reaction at the central portion of the furnace, i.e., in the area of a high temperature, by increasing the pressure of spraying the material oil, and the heat decomposition is accelerated by decreasing the amount of the excess air and elevating the temperature of preheating the air. Carbon black having a narrow size distribution and values of the CTAB specific surface area, 24M4 DBP and the specific tinting strength (TINT) in the prescribed ranges can be obtained in accordance with the above procedures.

It is necessary that the carbon black used for the rubber composition of the present invention described above is used in an amount of 10 to 100 parts by mass per 100 parts by mass of the natural rubber component. When the amount is less than 10 parts by mass per 100 parts by mass of the natural rubber component, the reinforcing property is not obtained. When the amount exceeds 100 parts by mass, the low heat buildup property deteriorates.

It is preferable that, in the mixing of the natural rubber with the slurry prepared by dispersing the above carbon black in water in advance, the carbon black is characterized in that (A) the particle size distribution of the carbon black in the slurry dispersed in water is such that the volume-average diameter of particles (mv) is 25 μm or smaller and diameters of particles in 90% by volume of the entire particles (D90) are 30 μm or smaller. When the volume-average diameter of particles (mv) is 25 μm or smaller and diameters of particles in 90% by volume of entire particles (D90) are 30 μm or smaller, dispersion of the carbon black in the rubber is further improved, and the reinforcing property and the abrasion resistance are further improved. When a shear force in an excess amount is applied to the slurry to decrease the particle size, the structure of the filler is destroyed, and a decrease in the reinforcing property arises. Therefore, it is preferable that (B) the 24M4 DBP absorption of the carbon black recovered from the slurry dispersed in water by drying retains a value of 93% or greater and preferably 96% or greater of the 24M4 DBP absorption before being dispersed in water.

The natural rubber latex used in the present invention may be treated to decompose the amide bond in the latex in advance. By the decomposition of the amide bond in advance, the problem of the increase in the viscosity of the rubber caused by entanglement between molecules due to the hydrogen bond of the amide bond can be decreased, and workability can be improved.

It is preferable that a protease and/or an aromatic polycarboxylic acid derivative is used for the decomposition of the amide bond in the treatment to decompose the amide bond. The protease has the property of hydrolyzing the amide bond present in the components of the surface layer of the particles of the natural rubber latex. Examples of the protease include acidic proteases, neutral proteases and alkaline proteases. In the present invention, alkaline proteases are preferable from the standpoint of the effect.

When the amide bond is decomposed with the protease, the decomposition can be conducted under a condition suitable for the enzyme used for the decomposition. For example, when ALKALASE 2.5L type DX manufactured by NOVOZYMES Company is mixed with a natural rubber latex, it is preferable that, in general, the treatment is conducted at a temperature in the range of 20 to 80° C. In the treatment, in general, pH is adjusted in the range of 6.0 to 12.0. The amount of the protease used for the treatment is, in general, in the range of 0.01 to 2% by mass and preferably in the range of 0.02 to 1% by mass of the natural rubber latex.

In the treatment using an aromatic polycarboxylic acid derivative, the aromatic polycarboxylic acid is a compound represented by the following general formula (I):

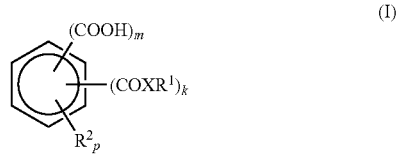

(I)

In the above general formula (I), m and k respectively represent an integer of 1 to 3, p represents an integer of 1 to 4, m+k+p=6 and, when m≧2, a portion of the carboxylic groups or the entire carboxylic groups may form anhydrides within the molecule. X represents oxygen atom, $NR^3$, $R^3$ representing hydrogen atom or an alkyl group having 1 to 24 carbon atoms or $-O(R^4O)_q$-, $R^4$ representing an alkylene group having 1 to 4 carbon atoms and q representing an integer of 1 to 5. $R^1$ represents an alkyl group having 1 to 24 carbon atoms, an alkenyl group having 2 to 24 carbon atoms or an aryl group having 6 to 24 carbon atoms. $R^2$ represents hydrogen atom, —OH, an alkyl group, an alkenyl group or an aryl group. A portion of the hydrogen atom or the entire hydrogen atoms in the groups represented by $R^1$ and $R^2$ may be substituted with halogen atoms.

In the present invention, among the aromatic polycarboxylic acid derivative represented by general formula (I), derivatives of phthalic acid, trimellitic acid, pyromellitic acid and anhydrides thereof are preferable. Examples of the preferable compound include monostearyl phthalate, monodecyl phthalate, N-octyl phthalic acid monoamide, polyoxyethylene phthalate lauryl ester, monodecyl trimellitate, monostearyl trimellitate, monostearyl pyromellitate and distearyl pyromellitate.

The condition for mixing the aromatic polycarboxylic acid derivative with the natural rubber latex can be suitably selected in accordance with the type of the natural rubber or the aromatic polycarboxylic acid derivative used for the mixing.

It is preferable that the amount of the aromatic polycarboxylic acid derivative is 0.01 to 30% by mass of the natural rubber latex. When the amount is less than 0.01% by mass, there is the possibility that the Mooney viscosity is not sufficiently decreased. When the amount exceeds 30% by mass, there is the possibility that the effect expected from the used amount is not obtained, and the fracture properties of the vulcanized rubber are adversely affected. It is more preferable that the amount is in the range of 0.05 to 20% by mass from the standpoint of the cost and the physical properties although the amount is varied within the above range depending on the type and the grade of the natural rubber latex.

In the step of the decomposition of the amide bond in the natural rubber, it is preferable that a surfactant is added so that the stability of the latex is improved. As the surfactant, anionic surfactants, cationic surfactants, nonionic surfactants and amphoteric surfactants may be used. Among these surfactants, anionic surfactants and nonionic surfactants are preferable. The amount of the surfactant is, in general, 0.01 to 2% by mass and preferably 0.02 to 1% by mass of the natural rubber latex although the amount can be adjusted in accordance with the properties of the natural rubber latex.

In the process of mixing the natural rubber latex and the slurry dispersed in water, it is necessary that a slurry containing the carbon black dispersed in water is prepared in advance. The process for preparing the slurry is not particularly limited, and a conventional process can be used.

For the preparation of the slurry containing the carbon black dispersed in water, a high shear mixer of the rotor stator type, a high pressure homogenizer, an ultrasonic homogenizer, a colloid mill or a homomixer can be used.

For example, the slurry can be prepared by placing a prescribed amount of the carbon black and water into a homomixer, followed by stirring for a prescribed time.

It is preferable that the concentration of the carbon black in the slurry is 0.5 to 30% by mass and more preferably 1 to 15% by mass of the slurry.

Coagulation to separate the master batch can be conducted using a coagulating agent such as an acid, examples of which include formic acid and sulfuric acid, and a salt, examples of which include sodium chloride, in accordance with a convention process. In the present invention, the coagulation may be conducted by mixing the natural rubber latex with the slurry without adding a coagulating agent.

To the master batch, where desired, various additives such as silica, other inorganic fillers, examples of which include alumina, alumina hydrate, aluminum hydroxide, aluminum carbonate, clay, aluminum silicate and calcium carbonate, and chemicals, examples of which include surfactants, vulcanizing agents, antioxidants, coloring agents and dispersants, may be added in combination with the carbon black.

As the final step of the preparation of the master batch, in general, drying is conducted. In the present invention, a conventional drier such as a vacuum drier, an air drier, a drum drier and a band drier can be used. It is preferable that the drying is conducted under the application of a mechanical shear force so that the dispersion of the carbon black is improved. A rubber exhibiting excellent workability, reinforcing property and low fuel consumption can be obtained by the application of a mechanical shear force. The drying may be conducted by using a conventional mixer. It is preferable that a continuous mixer is used from the standpoint of the industrial productivity. It is more preferable that a multi-screw extruder having screws rotating in the same direction or in different directions is used.

In the drying under the application of a mechanical shear force, it is preferable that the content of water in the master batch before the drying is 10% or greater. When the content of water is smaller than 10%, there is the possibility that the degree of improvement in the dispersion of the carbon black in the drying is decreased.

The rubber composition of the present invention can be obtained by using the natural rubber master batch containing carbon black described above. Various chemicals conventionally used in the rubber industry such as vulcanizing agents, vulcanization accelerators and antioxidants can be added to the rubber compositions as long as the object of the present invention is not adversely affected.

EXAMPLES

The present invention will be described more specifically with reference to examples in the following. However, the present invention is not limited to the examples.

The measurements in Examples and Comparative Examples were conducted in accordance with the following methods.

(1) Measurement of the particle size distribution of carbon black (the volume-average diameter of particles (my) and the diameters of particles in 90% by volume of the entire particles (D90)) in a slurry The measurement was conducted using a laser diffraction particle size analyzer (the MICROTRAC FRA type) in an aqueous medium (the refractive index: 1.33). As the particle refractive index, the value of 1.57 was used in all measurements. The measurement was conducted immediately after a dispersion was prepared so that re-aggregation of carbon black is prevented.

(2) CTAB specific surface area

The CTAB specific surface area was measured in accordance with the method of ISO 6810.

(3) 24M4 DBP absorption

The 24M4 DBP absorption was measured in accordance with the method of ISO 6894.

(4) Specific tinting strength

The specific tinting strength was measured in accordance with the method of ISO 5435.

(5) Resistance to fracture (tensile test)

The tensile test of a sample of a vulcanized rubber composition was conducted in accordance with the method of Japanese Industrial Standard K6251-1993, and the elongation at break (Eb) measured at 23° C. was obtained. The result is shown as an index using the result of Comparative Example 2 as the reference which is set at 100. The greater the value, the better the resistance to fracture.

(6) Heat buildup

Using SPECTROMETER manufactured by TOYO SEIKI Co., Ltd., tan δ (the loss coefficient) of a sample of a vulcanized rubber composition was measured at an amplitude of the dynamic stain of 1%, a frequency of 52 Hz and a temperature of measurement of 25° C. The result is shown as an index using the result of Comparative Example 2 as the reference which is set at 100. The greater the value, the better the result, i.e., the lower the heat buildup.

(7) Resistance to cut growth

The test of the resistance to cut growth was conducted using a sample of a vulcanized rubber composition at a temperature of 40° C. in accordance with the method of Japanese Industrial Standard 1(6260. The result is shown as an index using the result of Comparative Example 2 as the reference which is set at 100. The greater the value, the better the result.

Preparation Example 1

Preparation of Carbon Black

Using a conventional apparatus for producing oil furnace carbon black, carbon blacks C, D and E were prepared under the conditions shown in Table 1. A commercial carbon black "ASAHI #70L" (a trade name) manufactured by ASAHI CARBON Co., Ltd. was used as carbon black A (N326), and a commercial carbon black "ASAHI #70" (a trade name) manufactured by ASAHI CARBON Co., Ltd. was used as carbon black B (N330).

TABLE 1

|  | Type of carbon black | | | | |
| --- | --- | --- | --- | --- | --- |
|  | A | B | C | D | E |
| Condition of preparation of carbon black | | | | | |
| amount of the air introduced during the production (kg/h) | commercial product N326 | commercial product N330 | 1030 | 1050 | 1150 |
| temperature of preheating the air (° C.) | | | 670 | 670 | 665 |
| amount of introduction of fuel (kg/h) | | | 62 | 63 | 70 |
| fraction of excess amount of the air in the fuel (%) | | | 17.2 | 17.5 | 15.9 |
| amount of introduction of material oil (kg/h) | | | 287 | 277 | 275 |
| pressure of spraying material oil (MPa) | | | 2.2 | 2.3 | 2.2 |
| temperature of preheating material oil (° C.) | | | 210 | 215 | 195 |
| amount of potassium (relative to the amount of material oil) (ppm) | | | 85 | 71 | 56 |

TABLE 1-continued

| | Type of carbon black | | | | |
|---|---|---|---|---|---|
| | A | B | C | D | E |
| Physical and chemical properties of carbon black | | | | | |
| CTAB ($m^2$/g) | 83 | 82 | 86 | 98 | 107 |
| 24M4 DBP ($cm^3$/100 g) | 68 | 88 | 59 | 62 | 65 |
| specific tinting strength (TINT) | 110 | 104 | 126 | 128 | 131 |

Preparation Example 2

Preparation of a Natural Rubber Latex

1. Natural rubber latex 1
A field latex of natural rubber (the content of the rubber component: 24.2%) was diluted with deionized water to obtain a natural rubber latex having a content of the rubber component of 20%.

2. Natural rubber latex 2
A field latex of natural rubber (the content of the rubber component: 24.2%) was diluted with deionized water to obtain a natural rubber latex having a content of the rubber component of 20%. To the obtained natural rubber latex, 0.5% of an anionic surfactant (DEMOL N manufactured by KAO Co., Ltd.) and 0.1% of an alkaline protease (ALKALASE 2.5L type DX manufactured by NOVOZYMES Company) were added. The amide bond in the natural rubber was decomposed by stirring the above mixture at 40° C. for 8 hours.

Preparation Example 3

Preparation of a Slurry Containing Carbon Black Dispersed in Water

Into a colloid mill having a rotor having a diameter of 50 mm, 1425 g of deionized water and 75 g of one of carbon blacks A, C, D and E were placed. The resultant mixture was stirred at a speed of rotation of 5,000 rpm at a gap between rotor and stator of 0.3 mm for 10 minutes, respectively. In this manner, slurries dispersed in water A, C, D and E were prepared using carbon blacks A, C, D and E, respectively.

The size distribution of carbon black (the volume-average diameter of particles (mv) and diameters of particles in 90% by volume of the entire particles (D90)) and the retention of 24M4 DBP absorption of carbon black dried and recovered from a slurry dispersed in water are shown in Table 2 for slurries dispersed in water A, C, D and E.

TABLE 2

| | Slurry dispersed in water | | | |
|---|---|---|---|---|
| | A | C | D | E |
| Carbon black | A | C | D | E |
| Size distribution (μm) | | | | |
| volume-average diameter of particles (mv) | 10.5 | 9.7 | 10.1 | 8.6 |
| diameters of particles in 90% by volume of entire particles (D90) | 15.3 | 13.3 | 17.4 | 12.3 |
| 24M4 DBP absorption before dispersion in water ($cm^3$/100 g) | 68 | 59 | 62 | 65 |

TABLE 2-continued

| | Slurry dispersed in water | | | |
|---|---|---|---|---|
| | A | C | D | E |
| Retention of 24M4 DBP absorption of dried and recovered carbon black (%) | 97.1 | 98.3 | 96.8 | 96.9 |

Examples 1 to 3 and Comparative Example 1

One of natural rubber latices A and B prepared in Preparation Example 2 and one of slurries dispersed in water A, C, D and E were mixed in amounts such that the ratio of the amounts by mass of the natural rubber to the carbon black was 10060, and formic acid was added to the resultant mixture under stirring until pH was adjusted at 4.5. The obtained four types of the master batches were each separated, washed with water and dehydrated until the content of water was about 40%. The obtained four types of the master batches were each dried by a twin screw extruder manufactured by KOBE SEIKO Co., Ltd. (screws having a diameter of 30 mm and an L/D of 35 rotating in the same direction; vent holes at 3 positions) at a barrel temperature of 120° C. and a speed of rotation of 100 rpm.

Using the four types of the natural rubber wet master batches prepared as described above, rubber compositions of Examples 1 to 3 and Comparative Example 1 were prepared in accordance with the formulations shown in Table 3.

After the four types of the rubber compositions were vulcanized, the measurements of the resistance to fracture (the tensile test), the heat buildup and the resistance to cut growth were conducted in accordance with the methods described above. The results are shown in Table 4. The physical and chemical properties of the carbon blacks shown in Table 1 are also shown for convenience.

TABLE 3

| | part by mass |
|---|---|
| Natural rubber | 100 |
| Carbon black | 60 |
| Cobalt salt of an organic acid | 0.9 |
| Zinc oxide | 8 |
| Antioxidant | 2 |
| Vulcanization accelerator | 1 |
| Sulfur | 5 |

TABLE 4

|  | Example | | | Comparative Example | | | |
|---|---|---|---|---|---|---|---|
|  | 1 | 2 | 3 | 1 | 2 | 3 | 4 |
| Process of preparation*[1] | wmb | wmb | wmb | wmb | dm | dm | dm |
| Natural rubber latex | 1 | 1 | 2 | 1 |  |  |  |
| Carbon black | C | D | E | A | A | B | D |
| Physical and chemical properties of carbon black |  |  |  |  |  |  |  |
| CTAB ($m^2/g$) | 86 | 98 | 107 | 83 | 83 | 82 | 98 |
| 24M4 DBP ($cm^3/100$ g) | 59 | 62 | 65 | 68 | 68 | 88 | 62 |
| specific tinting strength (TINT) | 126 | 128 | 131 | 110 | 110 | 104 | 128 |
| 0.41 × CTAB + 81 | 116 | 121 | 125 | 115 | 115 | 115 | 121 |
| resistance to fracture (elongation at break (Eb) in tensile test) | 115 | 117 | 121 | 101 | 100 | 70 | 105 |
| heat buildup | 95 | 101 | 103 | 96 | 100 | 85 | 111 |
| resistance to cut growth | 131 | 137 | 144 | 106 | 100 | 64 | 109 |

*[1]wmb: prepared by using a natural rubber wet master batch
dm: prepared by dry mixing Comparative Examples 2 to 4

Using carbon blacks A, B and D shown in Table 1, rubber compositions of Comparative Examples 2 to 4 were prepared in accordance with the formulations shown in Table 3 by the dry mixing using a Banbury mixer.

After the three types of the rubber compositions were vulcanized, the measurements of the resistance to fracture (the tensile test), the heat buildup and the resistance to cut growth were conducted in accordance with the methods described above. The results are shown in Table 4. The physical and chemical properties of the carbon blacks shown in Table 1 are also shown for convenience.

The chemical names and the trade names of the organic chemicals used in Table 3 are shown in the following:

Cobalt salt of an organic acid: manufactured by RHODIA Company, MANOBOND C

Zinc oxide: manufactured by HAKUSUI KAGAKU Co., Ltd.; the trade name: ZINC OXIDE No. 1

Antioxidant: manufactured by OUCHI SHINKO KAGAKU KOGYO Co., Ltd.; the trade name: NOCRAC 6C Vulcanization accelerator: manufactured by OUCHI SHINKO KAGAKU KOGYO Co., Ltd.; the trade name: NOCCELOR DZ Sulfur: manufactured by KARUIZAWA SEIRENSHO Co., Ltd.

As shown in Table 4, the rubber compositions comprising the natural rubber wet master batch of the present invention using carbon blacks having the improved properties provided improved resistance to fracture, heat buildup and resistance to cut growth and, in particular, improved resistance to fracture and resistance to cut growth.

INDUSTRIAL APPLICABILITY

The rubber composition comprising the natural rubber wet master batch of the present invention provides excellent resistance to fracture and resistance to cut growth without adversely affecting the low heat buildup property and can be advantageously used for members, such as steel belts, steel breakers, carcass plies and bead chafers, of various tires such as radial tires for passenger cars, radial tires for truck and busses and radial tires for off-the-road vehicles, and to members, such as steel coating rubber, of industrial rubber products.

The invention claimed is:

1. A rubber composition for tire comprising a natural rubber wet master batch, which is obtained by mixing a natural rubber latex with a slurry obtained by dispersing a carbon black in water in advance, wherein the carbon black having:
   (1) a CTAB specific surface area ($m^2/g$) in a range of 60<CTAB<110,
   (2) a 24M4 DBP ($cm^3/100$ g) in a range of 55<24M4 DBP<75 and
   (3) the CTAB specific surface area and a specific tinting strength (TINT) satisfying a relation of TINT>0.41× CTAB+81, is used in an amount of:
   (4) 10 to 100 parts by mass per 100 parts by mass of a natural rubber component.

2. A rubber composition for tire according to claim 1, wherein, in the mixing,
   (A) a particle size distribution of the carbon black in the slurry dispersed in water is such that a volume-average diameter of particles (mv) is 25 μm or smaller and diameters of particles in 90% by volume of the entire particles (D90) are 30 μm or smaller, and
   (B) a 24M4 DBP absorption of the carbon black recovered from the slurry dispersed in water by drying retains a value of 93% or greater of a 24M4 DBP absorption before being dispersed in water.

3. A rubber composition for tire according to claim 2, wherein the natural rubber latex is treated to decompose amide bond in the latex in advance.

4. A rubber composition for tire according to claim 3, wherein a protease and/or an aromatic polycarboxylic acid derivative is used in the treatment to decompose amide bond.

5. A rubber composition for tire according to claim 4, wherein the protease is an alkaline protease.

6. A rubber composition for tire according to claim 1, wherein a surfactant is added to the natural rubber latex and/or the slurry.

7. A rubber composition for tire according to claim 1, wherein drying is conducted under the application of a mechanical shear force when the natural rubber wet master batch is dried after being separated by coagulation.

8. A rubber composition for tire according to claim 7, wherein the drying is conducted using a continuous mixer.

9. A rubber composition for tire according to claim 8, wherein the continuous mixer is a multi-screw extruder.

* * * * *